Patented Aug. 10, 1954

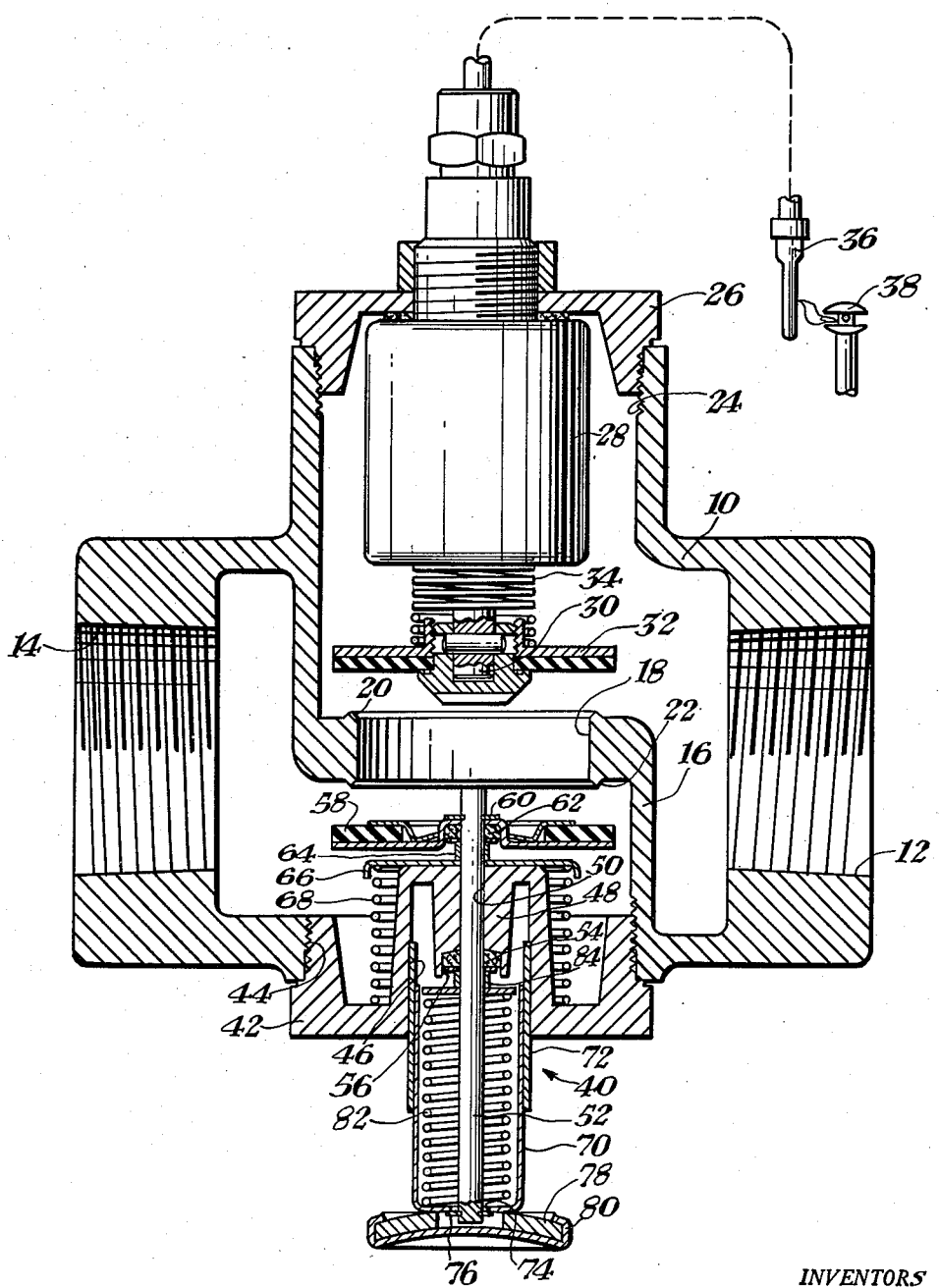

2,685,803

UNITED STATES PATENT OFFICE 2,685,803

MANUALLY OPERABLE ACTUATING DEVICE

Victor Weber, Greensburg, and William J. Russell, Jeannette, Pa., assignors to Robertshaw-Fulton Controls Company, Greensburg, Pa., a corporation of Delaware Application September 18, 1951, Serial No. 247,034

2 Claims. (Cl. 74—503)

This invention relates generally to manually operable actuating devices and more particularly to push-button actuators for valves or the like.

In many devices such as valves wherein a reciprocable plunger extends into a casing for actuating an element enclosed therein, it is necessary to maintain a fluid seal around the plunger to prevent leakage from the casing at this point. While it is difficult to maintain such a seal when the plunger moves with a true reciprocating motion, it is almost impossible to maintain a fluid tight seal around a plunger for an extended period when the same is subjected to lateral forces tending to cause deviation thereof from pure axial movement. Furthermore, lateral forces tend to distort such a plunger and cause it to bind in its bearing. Accordingly, it is an object of this invention to protect such an actuating plunger from the effects of external lateral forces.

Another object of this invention is to impart simple axial movement to an operating plunger from a manually operable reciprocable element subject to radial as well as axial forces.

Another object is to protect a reciprocable valve stem from lateral forces and impacts.

Another object of this invention is to preclude lateral distortion of a reciprocable valve stem by external forces applied to a reciprocable push button operatively connected thereto.

To accomplish the above objects, the plunger is preferably telescoped within a tubular push button and the end thereof is operatively connected to the push button to be movable axially therewith but being free to move laterally relative thereto.

Other objects and advantages will become apparent from the following specification taken in connection with the drawing which is a sectional view of a fluid fuel burner automatic flame failure shut-off device having a resetting mechanism embodying this invention.

Referring more particularly to the drawing, the automatic flame failure shut-off device is shown as comprising a casing 10 having an inlet opening 12 and an outlet opening 14. A partition 16 extends transversely of the casing 10 and has a valve port 18 formed therein to provide communication between the inlet 12 and the outlet 14. A valve seat 20 surrounds the valve port 18 on one side of the partition 16 and a valve seat 22 surrounds the valve port 18 on the other side of the partition 16, the valve seats 20, 22 being adapted for cooperation with valve members to be more fully described.

A port 24 formed in the casing 10 in axial alignment with the valve port 18 is closed by a cap 26 on which is securely mounted a magnet housing 28. The housing 28 contains the usual electromagnet (not shown) having an armature (not shown) movable between attracted and released positions relative to the pole faces of the magnet. Carried by the armature for movement therewith and extending out of the housing 28 is an armature stem 30 which carries a disk valve member 32. Acting between the magnet housing 28 and the valve member 32 is a coil spring 34 which biases the valve member 32 toward the valve seat 20. When the armature is in its attracted position, the valve member 32 is retained away from the valve seat 20. On the other hand, when the armature is released, the spring 34 holds the valve member 32 on the valve seat 20 to interrupt communication between the inlet 12 and the outlet 14. Means for energizing the electromagnet to hold the valve member 32 in its open position may take the form of the usual thermocouple 36 arranged to be heated by the flame at a pilot burner 38.

As is customary in devices of this type, a manually operable reset mechanism, indicated generally by the reference numeral 40, is provided for moving the valve member 32 away from the valve seat 20 and resetting the armature in engagement with the pole faces of the electromagnet to hold the valve member 32 in its open position. The resetting mechanism 40 is here shown as mounted on a cap 42 threaded into a port 44 formed in the casing 10 and in axial alignment with the valve port 18 and the port 24.

An axially located recess 46 is formed in the cap 42 and the bottom wall thereof supports an axially located substantially cylindrical boss 48. A bore 50 is formed along the axis of the boss 48 to slidingly receive a shaft 52 which is encircled by a packing ring 54 fitted into an annular groove 56 formed in the outer end face of the boss 48. A disk valve member 58 is slidably mounted on the end of the shaft 52 which extends into the casing 10. One side of the valve member 58 is engaged by a snap ring 60 fitted into a suitable groove formed on the inner end of the shaft 52 and the other side of the valve member 58 is engaged by a packing ring 62. A gland 64 is slidably mounted on the shaft 52 to engage the packing ring 62 and an annular spring retainer 66 is also slidably mounted on the shaft 52 to engage one end of the gland 64. A coil spring 68 acting between the cap 42 and the spring retainer 66 biases the gland 64 into engagement with the packing ring 62 which in turn engages the valve member 58 to urge the same toward the snap ring 60.

Reset mechanisms of the type thus far described are well known in the art and, in operation, movement of the shaft 52 upwardly as viewed in the drawing, is effective to move the valve member 58 into engagement with the valve seat 22 to close the valve port 18. Further upward movement of the shaft 52 will move the end thereof into engagement with the valve member 32 to move the same off its seat 20 and reset the armature connected thereto. The valve member 58 is maintained in engagement with the valve seat 22 during this operation by the bias of the spring 68 and serves as a flow interrupter to maintain the valve port 18 closed during resetting.

In the past, the hereinbefore described movement of the shaft 52 has been effected through manual operation of a push button rigidly connected to the outer end of the shaft 52. However, with such an arrangement, it is difficult to maintain a fluid tight seal around the shaft 52 since the push button is subject to lateral impacts and thrusts which, if transmitted directly to the shaft 52, tend to distort the same and consequently distort the packing ring 54 to impair its fluid sealing properties.

In this invention lateral distortion of the shaft 52 and packing ring 54 is prevented by the provision of a push button which will impart only axial movement to the shaft 52 and which will be free to move laterally relative to the shaft 52. The push button is here shown as comprising an elongated cup-shaped element 70 slidably mounted in a tubular bearing 72 securely fastened to the walls of the recess 46. The outer end of the shaft 52 extends through a hole 74 formed in the bottom wall of the cup-shaped element 70. The diameter of the hole 74 is substantially larger than the diameter of the shaft 52 and a suitable snap ring 76 or the like is secured to the end of the shaft 52 to prevent withdrawal of the end of the shaft 52 from the hole 74.

Encompassing the outer end of the shaft 52 and secured to the end wall of the cup-shaped element 70 by spot welding or the like is an annular element 78 the diameter of the central aperture of which is substantially larger than the diameter of the snap ring 76. An imperforate plate 80 overlies the annular element 78 and has its peripheral portion crimped over the outer portion of the element 78. It is to be noted that the thickness of the element 78 should be sufficient to provide clearance between the end of the shaft 52 and the plate 80 when the snap ring 76 is in engagement with the end wall of the cup-shaped element 70 so that lateral movement of the cup-shaped element relative to the shaft 52 will not be inhibited.

The cup-shaped element is biased into engagement with the snap ring 76 by a coil spring 82 which encompasses the shaft 52 and acts between the end wall of the cup-shaped element 70 and a suitable gland 84 slidably mounted on the shaft 52 to engage the packing ring 54. The spring 82 is considerably stronger than the spring 68 so that the valve member 58 will be retained off its seat 22 when the push button is not manually depressed.

It will be apparent that the connection between the shaft 52 and the push button is such that axial forces applied to the cup-shaped element 70 will be transmitted directly to the shaft 52, the force of the spring 82 being applied through the snap ring 76 and manually applied forces being applied through the plate 80 which engages the end of the shaft 52 upon slight compression of the spring 82. However, in the event that the cup-shaped element 70 is subjected to a lateral thrust or impact, such lateral force is not transmitted to the shaft 52 since the clearance between the edges of the hole 74 and the shaft 52 is sufficient to permit lateral displacement of the cup-shaped element 70 relative to the shaft 52.

The embodiment of the invention shown in the drawing is for illustrative purposes only and it is to be expressly understood that the drawing and foregoing specification are not to be construed as a definition of the limits or scope of the invention, reference being had to the appended claims for that purpose.

It is claimed and desired to secure by Letters Patent:

1. A manually operable actuating device comprising an axially movable shaft, a bearing coaxial with said shaft, a cup-shaped push-button element slidably mounted in said bearing to encompass at least a portion of said shaft, said element extending out of said bearing to be accessible to a user and having a port in the bottom wall thereof of larger diameter than said shaft to loosely receive an end portion of said shaft, abutment means carried on said end portion of said shaft and slidably engageable with the outer surface of said bottom wall of said cup-shaped element for relative radial movement along all radii of said element, and a plate supported by said element to be slidably engageable with the end surface only of said end portion of said shaft.

2. A manually operable actuating device comprising an axially movable shaft, a bearing coaxial with said shaft, a cup-shaped push button element slidably mounted in said bearing to encompass at least a portion of said shaft, said element extending out of said bearing to be accessible to a user and having a port in the bottom wall thereof of larger diameter than said shaft to loosely receive an end portion of said shaft, abutment means carried on said end portion of said shaft and slidably engageable with the outer surface of said bottom wall of said cup-shaped element for relative radial movement along all radii of said element, a plate supported by said element to be slidably engageable with the end surface only of said end portion of said shaft, means for biasing said element into engagement with said abutment means, and means cooperable with said shaft for limiting movement of the same and movement of said element under said bias.

References Cited in the file of this patent

UNITED STATES PATENTS

| Number | Name | Date |
|---|---|---|
| 906,665 | Stevens | Dec. 5, 1908 |
| 987,218 | Cordley | Mar. 21, 1911 |
| 987,633 | Long | Mar. 21, 1911 |
| 1,238,926 | Long | Sept. 4, 1917 |
| 2,217,330 | Buttner | Oct. 8, 1940 |
| 2,305,941 | Wantz | Dec. 22, 1942 |
| 2,343,904 | Hegwein | Mar. 14, 1944 |
| 2,574,036 | Henchert | Nov. 6, 1951 |